Z. Doolittle,
Boring Hubs,
N° 18,808.  Patented Dec. 8, 1857.

Witnesses:
Edward Jackson
Jesse A. Holzclaw

Inventor
Zina Doolittle

UNITED STATES PATENT OFFICE.

ZINA DOOLITTLE, OF PERRY, GEORGIA.

MACHINE FOR BORING HUBS.

Specification of Letters Patent No. 18,808, dated December 8, 1857.

*To all whom it may concern:*

Be it known that I, ZINA DOOLITTLE, of Perry, in the county of Houston and State of Georgia, have invented a new and useful Machine for Cutting Out Carriage-Hubs for the Reception of Boxes and other Purposes; and I do hereby declare that the following is a full, clear, and exact description of the construction and operation of the same, reference being had to the annexed drawings, making a part of this specification, in which—

Figure 1:
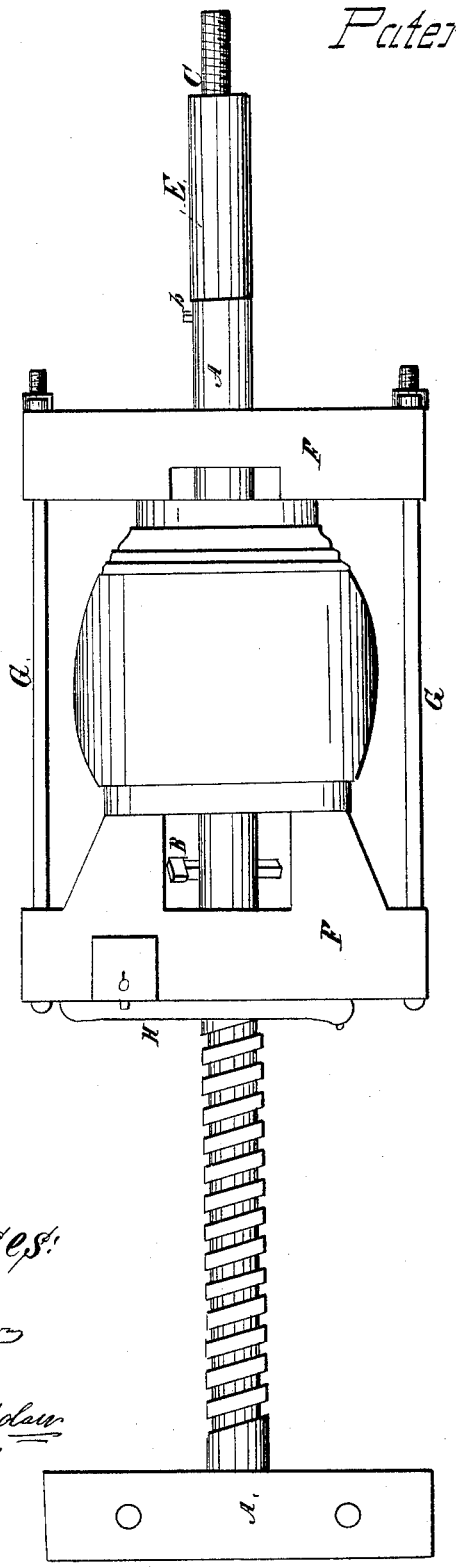
Figure 2:
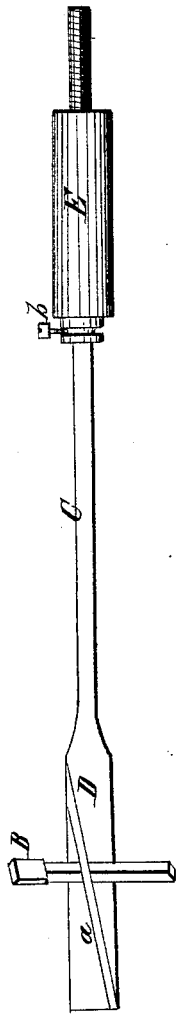

Figure 1 is a perspective view, while Fig. 2 represents the device for expanding and contracting the knife or cutter.

A, A, represents a hollow mandrel or shaft, with a cross piece at one end and a square thread extending from the cross piece nearly half way of the mandrel.

B is the knife or cutter.

C is a rod with two or three inches of one end half round, represented by D and a thread at the other end, the half round part fitting that part of the hollow under the cutter B in mandrel. Upon the face side of D is a raised bar $a$, extending across at about an angle of 90 degrees. The bar $a$ is made to correspond with a groove on the under side of cutter B in which it works, thus giving motion either way as the rod is passed in or drawn out by the thread at the other end.

E is a nut the same size and secured to the mandrel by the screws $b$, as seen in Fig. 2, allowing the nut to turn, driving in or drawing out the rod C, thus expanding or contracting the cutter B.

The upper side of the thread on rod C is filed off leaving a smooth surface upon which are marks and figures denoting the side of the circle which the cutter B will make when the outer end of nut E agrees with the mark, by regularly turning the nut E while the hub is being cut. The hub may be cut to any desired taper.

F, F, are two yokes through the center of which the mandrel passes, and between which the hub is centered, and secured by two bolts G, G.

H is a spring with a half nut fitting the thread on mandrel attached regulating the feed of the cutter B.

I do not claim the use of a shaft or a knife set in the shaft, neither do I claim the yokes F, F, or feed spring H. But I do claim—

The employment of a hollow shaft, rod C, and the projection $d$ with the nut E, for the purpose of expanding the cutter B when the whole is arranged as shown substantially and for the purpose specified.

ZINA DOOLITTLE.

Witnesses:
WM. B. HOBSON,
E. M. HULSEY.